(12) United States Patent
Broillet

(10) Patent No.: US 6,498,501 B2
(45) Date of Patent: *Dec. 24, 2002

(54) MEASURING CIRCUIT

(75) Inventor: Bernard Broillet, Misery (CH)

(73) Assignee: Vibro-Meter, S.A. (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,280

(22) Filed: Oct. 18, 1999

(65) Prior Publication Data

US 2002/0008527 A1 Jan. 24, 2002

Related U.S. Application Data

(63) Continuation-in-part of application No. 09/229,203, filed on Jan. 13, 1999, now abandoned.

(30) Foreign Application Priority Data

Sep. 15, 1998 (EP) ............................................. 98810920

(51) Int. Cl.[7] ............................................. G01N 27/26
(52) U.S. Cl. ....................................... 324/727; 324/667
(58) Field of Search ............................... 324/727, 509, 324/512, 772, 548, 125, 658, 660, 627, 669, 667

(56) References Cited

U.S. PATENT DOCUMENTS

| | | | |
|---|---|---|---|
| 3,646,434 A | * 2/1972 | Norwich | 324/669 |
| 4,656,416 A | 4/1987 | Brasfield | 324/527 |
| 4,674,325 A | 6/1987 | Kiyobe et al. | 73/73 |
| 4,695,788 A | 9/1987 | Marshall | 324/527 |
| 4,849,872 A | 7/1989 | Gassler | 363/49 |
| 4,924,179 A | 5/1990 | Sherman | 324/755 |
| 4,982,155 A | 1/1991 | Ramsden | 324/207.2 |
| 5,113,116 A | 5/1992 | Wilson | 310/316 |
| 5,272,439 A | 12/1993 | Mashikian et al. | 324/520 |
| 5,347,841 A | 9/1994 | Enzinna | 73/1 D |
| 5,359,291 A | 10/1994 | Dommerich | 324/523 |
| 5,572,143 A | 11/1996 | Myers et al. | 324/555 |
| 5,894,223 A | 4/1999 | Medelius et al. | 324/529 |
| 5,942,982 A | 8/1999 | Noble et al. | 340/652 |
| 5,977,773 A | 11/1999 | Medelius et al. | 324/520 |

FOREIGN PATENT DOCUMENTS

CH 658 908 * 12/1986

* cited by examiner

Primary Examiner—N. Le
Assistant Examiner—Vincent Q. Nguyen
(74) Attorney, Agent, or Firm—Ostrolenk, Faber, Gerb & Soffen, LLP

(57) ABSTRACT

A measuring circuit includes a symmetric transmission line connecting a transducer to a measurement amplifier and to a fault indicating signal amplifier, the transducer delivering symmetric input signals to amplifiers, the first amplifier delivering a measuring signal representing the difference of its input signals and the fault indicating signal amplifier delivering a fault indicating signal representing the sum of the input signals. An auxiliary signal injected to the terminals of the transducer the invention enables the measuring circuit to evaluate the quality of the measuring circuit during operation of the tested machine and also when the machine is at rest.

10 Claims, 2 Drawing Sheets

MEASURING CIRCUIT

This application is a Continuation-In-Part of pending U.S. application Ser. No. 09/229,203, filed Jan. 13, 1999, now abandoned.

The present invention relates to a measuring circuit comprising a transducer connected to a measuring unit by a transmission line, said transducer being connected symmetrically and the measuring unit being suitable for adding up the values of signals present on the terminals of the transducer to deliver a fault indicating signal and being also suitable for forming the difference of the values of the signals present on the terminals of the transducer, the difference signal constituting the measuring signal.

BACKGROUND OF THE INVENTION

Such a circuit is known from Swiss patent No. 658 908. This circuit serves e.g. for detecting vibrations of a rotary machine that can be a motor of an airplane or any other vibrating structure. It allows to evaluate the quality of the circuit, that means to find faults as for instance of the circuit, that means to find faults as for instance interruptions, short-circuits, bad insulation, intermittent connections at or near to the sensor as well as in the transmission circuit. Moreover, it is also possible to detect the influences of external interference signals produced by electromagnetic coupling, electrostatic coupling or by a ground loop. In general terms, a transmission line between the transducer and the measuring circuit can be interrupted by one or several connectors at passages through walls located between the piezoelectric transducer and the measuring device for vibrations or pressures.

In spite of the advantageous possibilities that the above mentioned circuit offers, it suffers from an important disadvantage. The test signals and the fault indicating signal respectively are only produced when the device to be monitored, e.g. a motor, is in operation. This is the case, because the vibrations of the device to be monitored produce in the transducer both the vibration measurement signal and the test signal for testing the operation of the measuring circuit. The requirement to operate the device in order to test it is particularly inconvenient e.g. for testing the vibration measuring circuit of a motor of an airplane or a great machine like a gas or vapor turbine which has to be put in operation in order to obtain a test result.

SUMMARY OF THE INVENTION

The aim of the present invention is to provide a complete surveillance of the vibration measuring circuit of a machine not only when the machine is in operation, but also when the machine is at rest.

This aim is attained with a measuring circuit of the above mentioned kind, wherein said measuring circuit comprises means for injecting an auxiliary signal to the terminals of the transducer.

By injecting an "artificial" auxiliary signal one simulates a known noise in common mode that is used for testing the measuring circuit. Moreover, the following advantages are obtained:

The auxiliary test signal is independent from the amplitude and the frequency of vibration, the parameters such as frequency and amplitude are foreseeable, the presence of the transducer can be detected.

Other features and advantages of the present invention will become apparent from the following description of the invention which refers to the accompanying drawings.

BRIEF DESCRIPTION OF THE DRAWINGS

Herein below an advantageous embodiment of the invention will be described with reference to the enclosed drawing in which.

DESCRIPTION OF A PREFERRED EMBODIMENT

Figure 1:
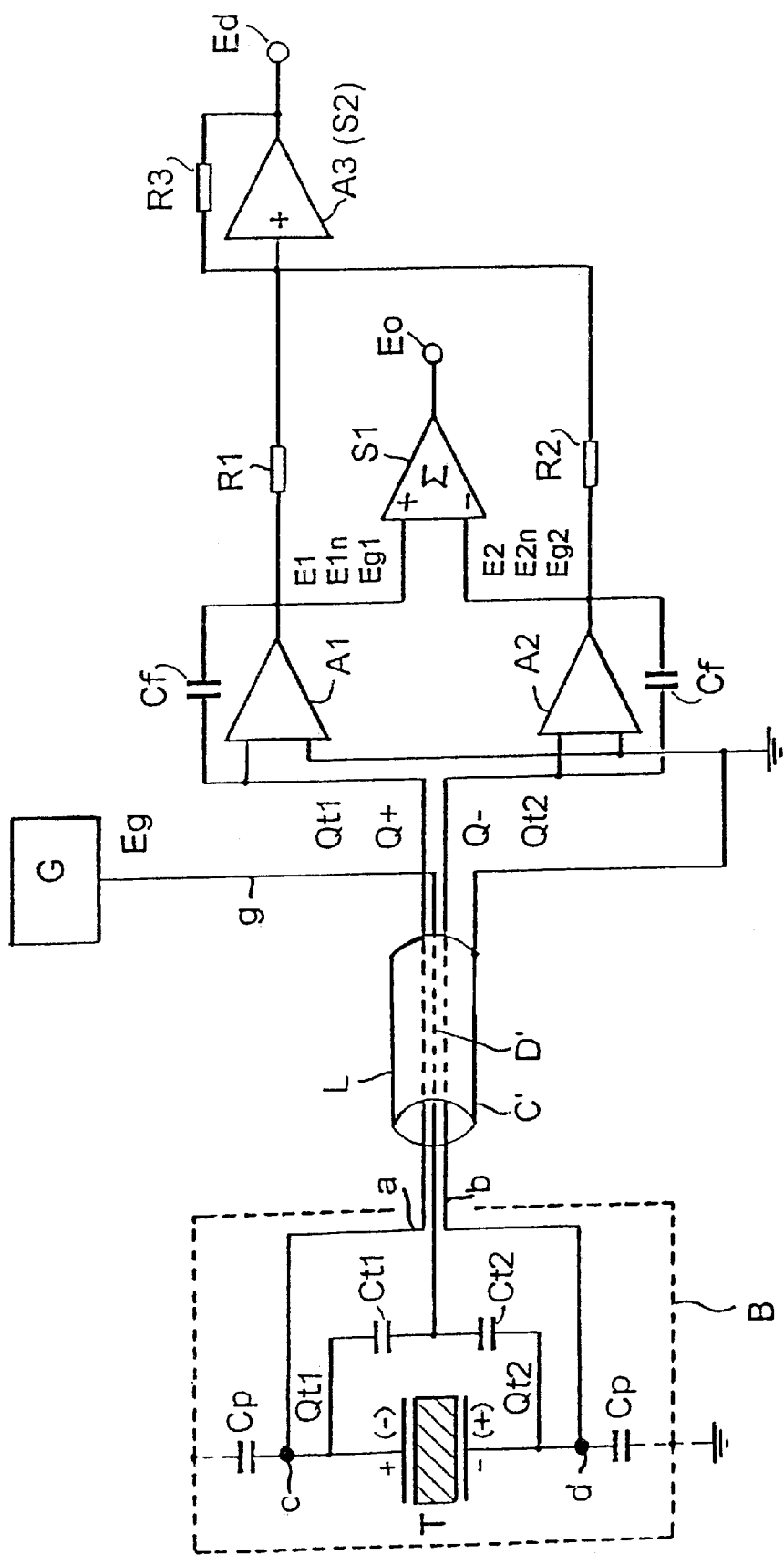
FIG. 1 is a schematic view of a measuring circuit with a piezoelectric transducer.
Figure 2:
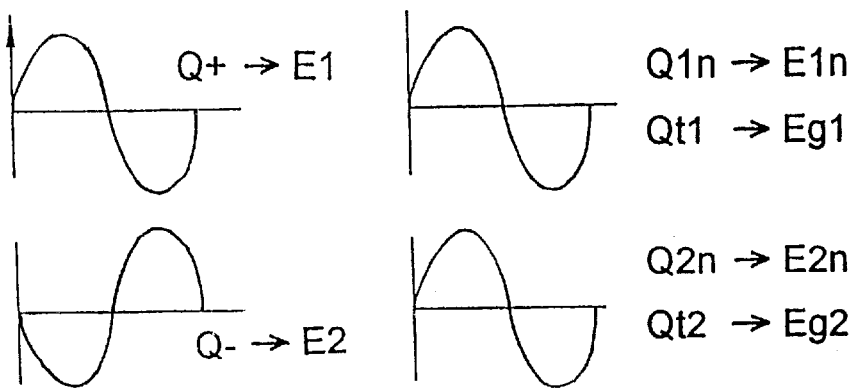
FIG. 2 shows the signals at the terminals of the transducer and at the inputs of the amplifiers S1 and S2 respectively.

FIG. 1 shows schematically a measuring circuit according to the invention. A piezoelectric transducer T is symmetrically connected to two wires a and b at one end of a symmetric and shielded transmission line L. The transducer T is located within a shielded container B that can be electrically connected to the shielding C' of the transmission line or cable L. At the opposite end of cable L wires a and b are connected to two charge amplifiers A1 and A2 respectively, each of which is connected to a feed-back capacitor Cf. The outputs of the amplifiers A1 and A2 are connected to a measurement amplifier or summing integrator S1 which delivers an output voltage Eo. The transducer T, which is designed to measure the vibrations of a motor, e.g. of an airplane or a machine tool, etc. (not shown) onto which it is installed, has a sensitivity given in pC/g (where pC=picocoulomb and where g represents the acceleration of free fall of a body). For a given acceleration g it delivers charges Q+ and Q− that in principle have the same value but opposite polarization. These charges are connected to the inputs of the charge amplifiers A1 and A2 which at their outputs deliver voltages E1 and E2 that are proportional to the charges but which have opposite phases (FIG. 2). These voltages are defined by the equation:

$$E1 = Q+/Cf \text{ and } E2 = Q-/Cf$$

and the voltage Eo at the exit of the summing integrator S1 is given by $$Eo = E1 - E2 = 2Q/Cf, \text{ if } E2 = -E1.$$

If for instance the sensitivity of the transducer is 50 pC/g, the maximum acceleration is 1 g and Cf is 1 nF, the resulting charges Q+ and Q− have a maximum value of 50 pC and according to the above equation the maximum value of Eo is Eo=0.1 V.

The circuit of FIG. 1 therefore allows measuring the vibrations of the machine onto which the transducer is mounted. However, for evaluating the defaults of quality of the transducer or the transmission line, or even the measuring circuit itself, as e.g. interruptions, short circuits, bad insulation, intermittent contact and interference signals induced into the measuring circuit from the exterior, it is advantageous and necessary not only to treat the signals E1 and E2 in differential mode, but also in common mode. For this purpose, a fault signal amplifier A3 is provided that is also a summing integrator S2, as indicated in FIG. 1.

Fault signal amplifier A3 delivers a fault signal Ed that represents the sum of all signals applied to its input.

Figure 3:
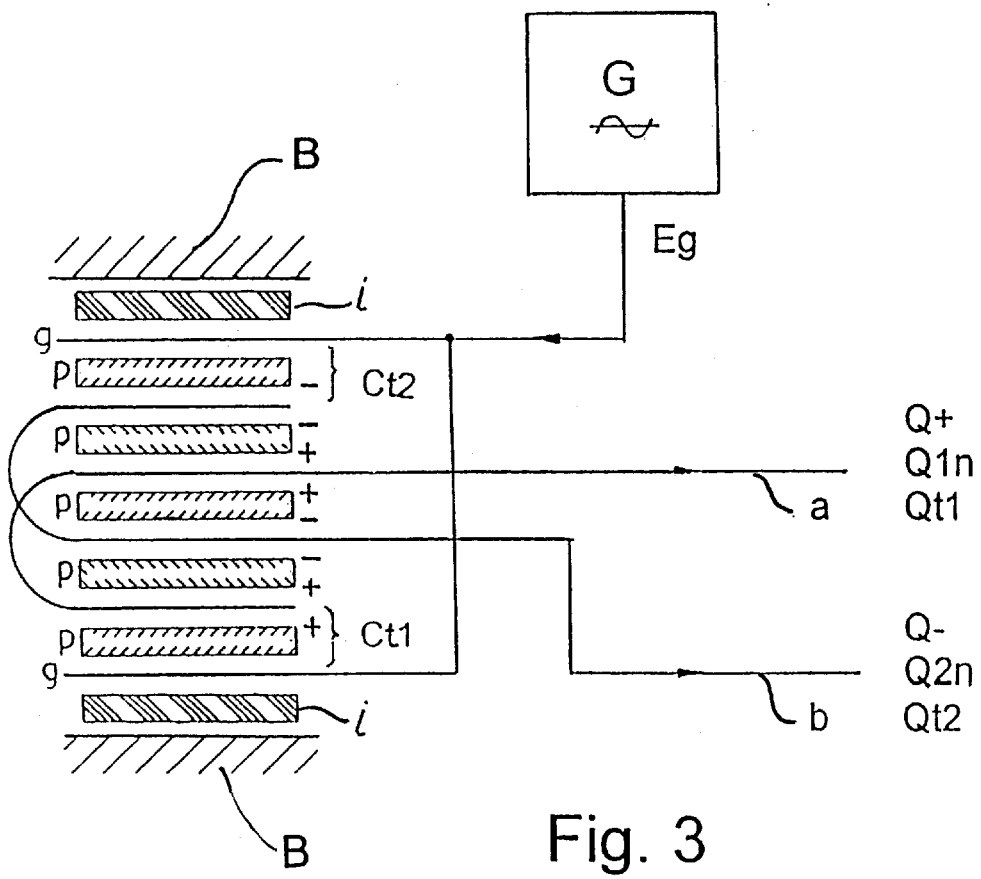
FIG. 3 illustrates details of the transducer according to the invention.

In the circuit of FIG. 1 it has been taken into account that interference signals E1n and E2n can be superposed to the useful signals E1 and E2. As illustrated in FIG. 3, the charges Q1n and Qn2 corresponding to the interference signals E1n and E2n are also present on the wires a and b respectively.

As indicated on FIG. 2 which also illustrates the signals E1 and E2, the interference signals E1n and E2n are induced with the same phase on each of the wires a and b of the connection line L. The arrows used in the representation of signals in FIG. 2, e.g. between Q+ and E1, mean "result in".

To perform a test of the machine to be monitored by the transducer or the measuring circuit respectively, either during operation of the machine or when the machine is at rest, an auxiliary generator G provides a signal Eg which has a suitable frequency that differs from the measurement frequency. The signal Eg is transmitted on a wire D' of the cable L to the transducer T where the signal is transmitted to terminals c and d of the transducer by signal injection capacitors Ct1 and Ct2 of identical values. Preferably, the capacitors Ct1 and Ct2 are integrated with transducer T, as shown in FIG. 3. Generator G supplies signal Eg to two electrodes g, each of which is situated between a layer of external insulation i and a layer of piezoelectric material p of the transducer. As illustrated in FIG. 3, an alternative auxiliary signal of same phase Qt1, Qt2 is thereby transmitted to each of the terminals c and d of the transducer. A signal Eg1 at the exit of charge amplifier A1 corresponds to signal Qt1. A signal Eg2 at the exit of charge amplifier A2 corresponds to signal Qt2.

In general, output signals Eo and Ed are defined by the following equations:

$$Eo = |E1| + |E2| + \Delta En + \Delta Eg = 2Q/Cf + \Delta En + \Delta Eg \quad 1)$$

$$Ed = \Delta E + |E1n| + |E2n| + |Eg1| + |Eg2| \text{ or} \quad 2)$$

$$Ed = |E1n| + |E2n| + |Eg1| + |Eg2| \quad 2')$$

with $\Delta En = |E1n| - |E2n|$ $\Delta E = |E1| - |E2|$ $\Delta Eg = |Eg1| - |Eg2|$ $Qt1 = Eg \times Ct1$ $Qt2 = Eg \times Ct2$ $Ct1 \approx Ct2$ Equation 2) is valid if the tested machine is in operation, whereas equation 2') is valid if the tested machine is at rest, that is not in operation.

Above equations 1), 2) and 2') allow to evaluate the quality of the measuring circuit.

Under normal conditions, that is if all elements of the circuit work properly, output signals Eo and Ed are given by equations 1), 2), and 2') respectively and signal Eo is proportional to the intensity of the vibrations of the motor.

In case of a short circuit, either in the transducer or along the transmission line, both signals Eo and Ed are zero. If the short circuit is between one of the terminals c or d and the container B or between a point of wires a or b and the shielding C' of the cable, one of the input signals of the measuring unit is zero and the measuring signal Eo and the fault indicating signal Ed are equal and in principle equal to one half of the value of signal Eo under normal conditions.

In case of an interruption within the transducer or at a point of the transmission line close to the transducer, the amplitude of the signals Eo and Ed depends from the location of the interruption, and this is due to the fact that the current loop is then closed by the coupling capacitance between the shielding (the container B) of the transducer and the shield C' of the cable L. The foregoing illustrate that knowledge of the signals Eo and Ed can give an information about the location of the interruption between the transducer and the detecting unit.

In case of a bad insulation of the transducer or of the transmission line, the amplitude of signal Eo will be intermediary between zero and 2Q/Cf. In case of an intermittent connection, the amplitudes of signals Eo and Ed depend from the duration of the interruption of the connection and its recurrence.

The detection of interference (noise) signals induced from the outside into the measuring circuit is as follows: The first type of these kind of signals is produced by what is called a ground loop, that is when the ground of the machine is connected to the ground of the electronic measurement circuit. Due to the stray capacitances Cp, which can be different from each other, a current circuit circulating through that loop produces an interference signal in each of the wires a and b of the transmission line. These signals are in phase and their sum appears in output signal Ed, whereas their difference appears in output signal Eo. This interference effect is thus detectable.

Another perturbing influence is produced by electromagnetic noise. In that case an alternative current of high intensity circulates in a conductor close to transmission line L and parallel to it. In spite of the shielding of this line such a current can induce interference voltages E1n and E2n in each of the conducting wires of the transmission line. E1n and E2n are in phase but their intensities may be different. According to equations 1), 2) and 2') mentioned above, the difference of the absolute values of the resulting influence of such interference voltages appear in output signal Eo and their sum in output signal Ed. These perturbing signals can be detected, because they have a frequency, which differs from the measurement frequency.

Finally, there also exists a capacitive influence due to electrostatic noise, e.g. due to capacitances between terminals of a connector which are close to other terminals which in that connector correspond to conductors a and b of the transmission line L, when this line traverses a wall. Due to the stray capacitances induced interference voltage may exist at the input of the measuring unit. As mentioned above, these voltages are detectable by means of the voltages Eo and Ed measured at the frequency of the perturbing voltages.

In general the measuring circuit according to the invention allows, by means of the evaluation of the signals Eo and Ed, to detect faults such as short circuits, interruptions and the like, as well within the transducer as in the transmission line, and even in the measuring unit itself. The measuring circuit according to the invention can thus also detect external interference influences.

The configuration of the measuring unit comprising the elements A1, A2, S1 and A3 (S3) is particularly simple. The measuring circuitry can include suitable means for processing output signal Eo and fault indicating signal Ed, and for using these signals—preferably after filtering out the portions of undesired frequencies and after rectification and analog/digital conversion—in an algorithm allowing to obtain indications about the quality of the measuring circuit.

In the figures described hereinabove, charge amplifiers A1 and A2 are represented as being part of the measuring circuit according to the invention. This, however, is not necessarily the case, because these amplifiers can without any problem be located within the shielding container B. In this case, the input signals of the measuring unit are not anymore the charges Q+ and Q− of the transducer, but voltages |E1|+|E1n|+|Eg1| and |E2|+|E2n|+|Eg2|. Generator G can also be located in the container B of the transducer.

Instead of capacitors Ct, Ct2 integrated with the transducer according to FIG. 3, discrete capacitors Ct1 and Ct2 can be used as shown in FIG. 1. The solution according to FIG. 3 presents the advantage that the presence or absence of the transducer T is indicated by the presence respectively absence of the auxiliary signal on wires a and b. This signal can also be generated by electromechanical excitation of the transducer fed with signal Eg provided by the auxiliary generator G. In this case, the auxiliary signals on the conducting wires a and b have opposite phases, and thus leads to opposite information Ed for certain conditions, in particular for the normal situation of the circuitry.

Instead of the piezoelectric transducer any other convenient transducer, e.g. an inductive, capacitive, resistive or electro-optic transducer can be used in conjunction with the circuitry described herein above or with a similar circuit adapted to the specific characteristics of the transducer.

In certain applications, the auxiliary signal could be a direct current (DC) signal.

What is claimed is:

1. A measuring circuit, comprising:
    a transducer comprising a transducer element and first and second series connected signal injection capacitors connected in parallel with the transducer, a shielded container for the transducer element and the first and second signal injection capacitors, the shielded container having a ground connection and three terminals, two of the terminals comprising first and second output terminals for outputting first and second output signals and the third terminal comprising at least one input terminal coupled to a common node between the capacitors;
    a measuring unit;
    connecting means having first and second input terminals and first and second output terminals, the first and second input terminals of the connecting means being connected to the first and second output terminals of the transducer and the connecting means delivering the first and second output signals on the first and second output terminals of the transducer to the first and second output terminals of the connecting means;
    the measuring unit comprising:
        a) a first amplifier having first and second input terminals connected, respectively, to the first and second output terminals of the connecting means for generating an output signal which is a function of the sum of the output signals present on the first and second output terminals of the connecting means;
        b) a second amplifier having first and second input terminals connected, respectively, to the first and second output terminals of the connecting means for generating an output signal which is a function of the difference of the output signals present on the first and second output terminals of the connecting means; and
        c) a generator for applying an auxiliary signal to said at least one input terminal of the transducer to test the operation of the measuring circuit.

2. A measuring circuit according to claim 1, in which the second amplifier operates in a difference mode to generate the output signal from the second amplifier, and the first amplifier operates in a common mode to generate the output signal from the first amplifier.

3. A measuring circuit according to claim 1, wherein the connecting means comprises a third and a fourth amplifier for amplifying respectively the signals present on the first and second output terminals of the transducer and respectively applying such signals after amplification to the first and second output terminals of the connecting means.

4. A measuring circuit according to claim 1, wherein the generator provides the auxiliary signal to said at least one input terminal of the transducer via an electrically conducting wire.

5. A measuring circuit according to any one of claims 1 and 4 wherein said transducer is a piezoelectric transducer, which comprises electrodes integrated with a piezoelectric element, the electrodes receiving the auxiliary signal, and further comprising capacitive means for transmitting the auxiliary signal from the electrodes to the first and second output terminals of the transducer, respectively.

6. A measuring circuit, comprising:
    a transducer comprising a transducer element and first and second series connected signal injection capacitors connected in parallel with the transducer, a shielded container for the transducer element and the first and second signal injection capacitors, the shielded container having a ground connection and three terminals, two of the terminals comprising first and second output terminals for outputting first and second output signals of the transducer and the third terminal comprising an input terminal coupled to a common node between the capacitors;
    a measuring unit;
    a connecting circuit having first and second input terminals and first and second output terminals, the first and second input terminals of the connecting circuit being connected to the first and second output terminals of the transducer and the connecting circuit delivering the first and second output signals on the first and second output terminals of the transducer to the first and second output terminals of the connecting circuit;
    the measuring unit comprising:
        a) a first amplifier having first and second input terminals connected, respectively, to the first and second output terminals of the connecting circuit for generating an output signal which is a function of the sum of the output signals present on the first and second output terminals of the connecting circuit;
        b) a second amplifier having first and second input terminals connected, respectively, to the first and second output terminals of the connecting circuit for generating an output signal which is a function of the difference of the output signals present on the first and second output terminals of the connecting circuit; and
        c) a generator for applying an auxiliary signal to the input terminal of the transducer to test the operation of the measuring circuit.

7. A measuring circuit according to claim 6, wherein the generator provides the auxiliary signal to the input terminal of the transducer via an electrically conducting wire.

8. A measuring circuit according to claim 6, wherein said transducer is a piezoelectric transducer including a piezoelectric element, and wherein the first and second signal injection capacitors comprises at least one first electrode integrated with the piezoelectric element, the at least one first electrode receiving the auxiliary signal, and further comprising at least one second electrode integrated with the piezoelectric element for transmitting the auxiliary signal to the first and second output terminals of the transducer, respectively.

9. A measuring circuit according to claim 6, in which the second amplifier operates in a difference mode to generate the output signal from the second amplifier, and the first amplifier operates in a common mode to generate the output signal from the first amplifier.

10. A measuring circuit according to claim 6, wherein the connecting circuit comprises a third and a fourth amplifier for amplifying respectively the signals present on the first and second output terminals of the transducer and respectively applying such signals after amplification to the first and second output terminals of the connecting circuit.

* * * * *